No. 862,248. PATENTED AUG. 6, 1907.
R. J. HARPER.
METALLIC PACKING.
APPLICATION FILED MAR. 12, 1906.
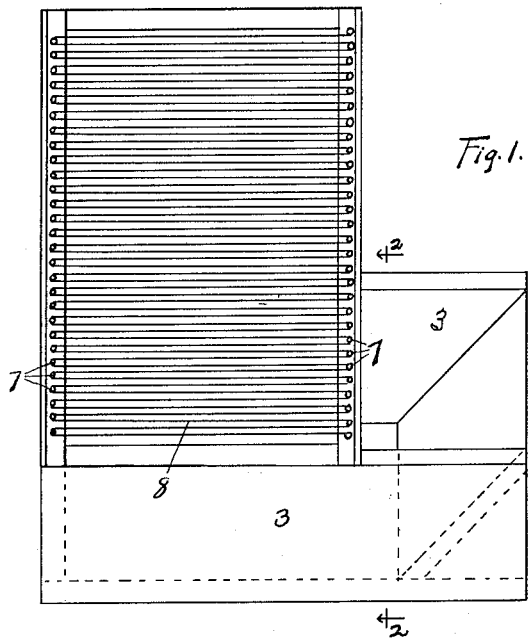
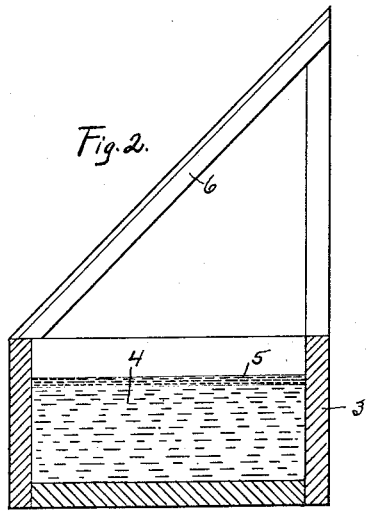
WITNESSES.
INVENTOR.

UNITED STATES PATENT OFFICE.

ROBERT J. HARPER, OF CHICAGO, ILLINOIS.

METALLIC PACKING.

No. 862,248.  Specification of Letters Patent.  Patented Aug. 6, 1907.

Application filed March 12, 1906. Serial No. 305,462.

*To all whom it may concern:*

Be it known that ROBERT J. HARPER, a citizen of the United States, residing at Chicago, in the county of Cook and State of Illinois, has invented certain new and useful Improvements in Metallic Packing, of which the following is a specification.

This invention relates to a method of producing a lubricating packing composed preferably of a suitable metal, a liquid or semi-liquid lubricant such as a grease, and non-conducting and dry lubricating substances such as mica and graphite.

My invention is not confined in its essentials to any particular combination of metals or materials, but for the purpose of this application for patent, I shall describe it as utilizing certain well known lubricating substances, for the purpose of bringing out clearly some of the advantages of my method and the utility of the product resulting therefrom.

In the accompanying drawing I have illustrated a simple form of appliance for carrying out my method in the following views:—

Figure 1 is a front elevation of the appliance, and Fig. 2 is a cross-section on line 2—2 of Fig. 1.

Referring to the drawing, 3 represents a tank adapted to hold liquids in which water 4, and a lubricating oil 5, are placed, the latter stratifying in the usual manner and forming a surface coating, preferably half an inch thick. Extending above a portion of the tank, at an angle of 45 degrees, is a frame 6, in the opposite inclined sides of which are pins 7 which are set closely together. A wire is laced back and forth on said frame and around said pins so as to form an inclined screen 8, the strands of which are in horizontal but slightly divergent planes.

With an appliance made substantially as shown and described, my packing is produced in the following manner:—Molten metal, preferably Babbitt metal and lead, of suitable proportions, is poured from a ladle at a height of from five to six feet upon said screen and upon coming in contact with the wires of the latter is cut into thin light flakes of irregular shape and size, which fall by gravity, first into the oil and passing through the oil, into the water in the tank. The hot metal in its contact with the oil, absorbs or takes up more or less of the latter, which adheres to the flakes even after they have become cooled by immersion in the water bath, thus giving them considerable lubricating qualities without further treatment. I prefer however, to dry the metal flakes of the water adhering thereto, and then mix and knead them thoroughly with mica, graphite and "Albany" grease or the like, making a homogeneous mass of same, the proportions of said ingredients depending somewhat on the quality of packing desired and the particular use to be made of same. If a moist lubricant is required, more grease will be used. If great non-conductivity and a dry lubricant is desired, more mica or graphite or both will be employed. When the flakes have been mixed with the substances named or any of them, they are pressed into cylindrical or semi-cylindrical molds of convenient size and then wrapped with tin-foil, in which condition they are ready for application. The metal after passing through the screen, oil and water, takes the form of various sizes of irregular shaped thin and semi-porous flakes, without lumps or strings, and in such condition is peculiarly adapted to take up and hold the lubricants combined therewith, the mica and graphite entering the voids in the flakes and the grease adhering to the surfaces. As the flakes are of a texture similar to that of thin tin-foil they are readily molded into any desired form.

I do not wish it to be understood from the aforegoing that the strata of oil on the water, is essential to produce the flaky condition of metal which is so desirable nor do I wish to be limited to the exact materials referred to nor to the form of screen employed, as these may all be varied within the scope of my invention.

I therefore claim:—

1. A method of producing a packing, consisting in passing molten metal through a screen and a liquid bath containing oil, then applying lubricants to the product.

2. A method of producing packing, consisting in passing molten metal through a screen and a liquid bath containing oil, applying a lubricant, and pressing the product into suitable shape.

3. A method of producing packing, consisting in converting molten metal into thin flakes by passing same through a suitable screen, immersing the particles in a bath of oil and water, and mixing the product with dry lubricants.

4. A method of producing a packing, consisting in passing molten metal through a screen, then subjecting it to an oil and water bath, and then applying dry lubricants thereto.

5. A method of producing a packing, consisting in passing molten metal through a screen, then subjecting it to an oil and water bath, and then mixing a dry lubricant therewith.

In testimony whereof I affix my signature in presence of two witnesses.

ROBERT J. HARPER.

Witnesses:
 O. K. TREGO,
 E. E. KLUPMEYER.